(12) United States Patent
Huang et al.

(10) Patent No.: US 7,455,442 B2
(45) Date of Patent: Nov. 25, 2008

(54) BACKLIGHT MODULE USING REPLACEABLE EXTERNAL ELECTRODE LAMPS

(75) Inventors: Chi-Jen Huang, Tai-Chung (TW); Hsin Chieh Lai, Hsin-Chu (TW)

(73) Assignee: HannStar Display Corp., Yang-Mei, Tao-Yuan Hsien (TW)

( * ) Notice: Subject to any disclaimer, the term of this patent is extended or adjusted under 35 U.S.C. 154(b) by 193 days.

(21) Appl. No.: 11/306,593

(22) Filed: Jan. 4, 2006

(65) Prior Publication Data

US 2006/0197420 A1 Sep. 7, 2006

Related U.S. Application Data

(63) Continuation-in-part of application No. 10/711,257, filed on Sep. 5, 2004.

(30) Foreign Application Priority Data

Jul. 8, 2004 (TW) ............................. 93120462 A

(51) Int. Cl.
*F21V 7/04* (2006.01)
(52) U.S. Cl. .................. 362/614; 362/611; 362/613; 362/630; 362/632; 362/633; 362/634
(58) Field of Classification Search .................. 362/614
See application file for complete search history.

(56) References Cited

U.S. PATENT DOCUMENTS

2002/0106182 A1 * 8/2002 Kawashima ................. 362/551
2003/0021114 A1 * 1/2003 Moon et al. ................. 362/235

FOREIGN PATENT DOCUMENTS

TW 540745 7/2003

* cited by examiner

*Primary Examiner*—Ali Alavi
*Assistant Examiner*—William J Carter
(74) *Attorney, Agent, or Firm*—Winston Hsu

(57) ABSTRACT

A backlight module includes a back plate, replaceable light source sets, external electrode lamps, and a fastening device. Each replaceable light source set is disposed on the back plate and has an electrically conductive strip. The external electrode lamps are disposed on one of the replaceable light source sets and each has an external electrode electrically connected with the electrically conductive strip. The fastening device is used for fastening the replaceable light source sets and comprises an electrically conductive element electrically connected with the electrically conductive strips.

18 Claims, 10 Drawing Sheets

BACKLIGHT MODULE USING REPLACEABLE EXTERNAL ELECTRODE LAMPS

CROSS REFERENCE TO RELATED APPLICATIONS

This is a continuation-in-part of U.S. application Ser. No. 10/711,257, which was filed on Sep. 5, 2004 and is included herein by reference.

BACKGROUND OF THE INVENTION

1. Field of the Invention

The invention relates to backlight modules, more particularly to a backlight module using replaceable external electrode lamps.

2. Description of the Prior Art

Most TFT-LCD (thin film transistor liquid crystal display) displays today utilize cold cathode fluorescent lamps (CCFL) for their backlight modules, where the electrodes of the lamps are effectively sealed inside. The electrode contains a conducting end that extends from the internal electrode to an external conducting wire. The conducting wire then connects to a power supply in order to draw energy for the lamp.

The conducting end of the CCFL is typically connected to the conducting wire through either a welding or a copper belting process. The welding or copper belting processes however, are both rather complicated and may result in high failure rates during operation. For example, poor soldering can often cause a fake welding effect. Fake welding effects are particularly susceptible to melting or breakage upon the lighting of the electrode, as sufficient heat is generated that will result in temperatures high enough to melt solder and damage the area of the fake weld. Also, if excess solder is located between the conducting end and the conducting wire, an electric discharge can result that can cause scorching or electrical leakage. When using a copper belting process, considerations for the potential electric discharges at the four corners of the copper belt must be made. This problem is typically addressed through the addition of an insulated heat-shrink tube to cover the external area of the copper belt, resulting in additional manufacturing costs for the CCFL.

Taiwan Patent No. 00540745 provides a backlight device that includes a set of lamps located inside a main structure, in which each of the lamps contains a conducting end extending from the internal lamp. The main structure includes a plurality of supporting devices, in which each of the devices contains a hole capable of holding a lamp, and a conducting element that electro-mechanically connects to the conducting end of the lamp. Although this patent design essentially manages to solve the aforementioned problems, the luminosity and life expectancy of the lamp proves more and more inefficient as backlight lamp technologies advance, and LCD panel sizes continue to increase. In order to cope with these increasing challenges, an external electrode fluorescent lamp (EEFL) was introduced.

EEFLs are a type of illumination device for transforming electrical energy into light energy released at high frequencies. In contrast to other fluorescent lamps that use an electrode to transform electrical energy into light energy, EEFL utilizes electromagnetic induction through a pair of metal electrodes covering the lamp to generate an internally induced current. A pair of metal electrodes covering the lamp is used as a primary coil of an adapter, whereas the lamp is being used as a secondary coil of an adapter.

Using the same amount of current, the luminosity of an external electrode fluorescent lamp is noticeably higher than that of a cold cathode fluorescent lamp. Moreover, the life expectancy of external electrode fluorescent lamp is significantly longer than that of cold cathode fluorescent lamps, as CCFLs usually last around 60,000 hours, whereas EEFLs last between 80,000 to 100,000 hours. As a result, external electrode fluorescent lamps have been gradually integrated into TFT-LCD backlight modules due to the significant advantages they offer.

Although EEFLs exhibit several benefits over CCFLs, they are not without their disadvantages. Because the electrodes of EEFLs are constantly driven by high voltages while being exposed to external environments, numerous electric shocks are commonly experienced. In addition, the layout of the electrode power supply used to stabilize the external electrode lamp places various limitations on the shock resistance design. Consequently, many of the EEFL products sold in the market today still suffer from problems such as poor electrode cladding and poor shock resistance.

Conventional LCD backlight modules using EEFL have the lamps electrically connected in parallel on a back plate, with the backlight module attached to the optical film of the LCD panel. If any single lamp becomes damaged or broken, the overall illumination decreases, resulting in a poor display quality. To restore the illumination levels to back to factory specifications, the damaged or broken lamps should be replaced. This is accomplished by first disassembling the LCD, removing the lamp holder, replacing the damaged or broken lamp, and finally reassembling the removed components. The replacement of damaged lamps is therefore a tedious and precise process that introduces the possibility of damaging other components during repair. In particular, other components such as adjacent lamps, optical film sets, and the driver circuit are very fragile, and are easily susceptible to damage when replacing a damaged lamp. As LCDs become larger and larger, the effort required to replace lamps in an LCD becomes increasingly larger and more difficult.

Therefore, a need exists for a backlight module that allows for the simple replacement of backlight lamps, while minimizing the problems associated with EEFLs such as poor electrode cladding and poor shock resistance.

SUMMARY OF THE INVENTION

It is an objective of the claimed invention to provide a backlight module using replaceable external electrode lamps, the backlight module possessing sufficient wrapping and cushioning in order to solve the aforementioned problems.

According to the present invention, the backlight module includes a back plate, a plurality of replaceable light source sets, a plurality of external electrode lamps, and a fastening device. The replaceable light source sets are disposed on the back plate and each has an electrically conductive strip. The external electrode lamp is disposed on one of the replaceable light source sets, and an external electrode thereof is electrically connected with the electrically conductive strip. The fastening device is used for fastening the replaceable light source sets and comprises an electrically conductive element electrically connected with adjacent electrically conductive strips.

The present invention offers the advantage of allowing the lamps of the backlight module to be easily replaced through its unique structure. This is accomplished through removing the externally replaceable light source set, changing the lamps on replaceable the light source set, and pushing back the replaceable light source set to complete the lamp replacement. The structure also provides distinctive features including an optimized electrode cladding and a strong resistance to shocks and impacts to thereby increase the safety and reliability of the product.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
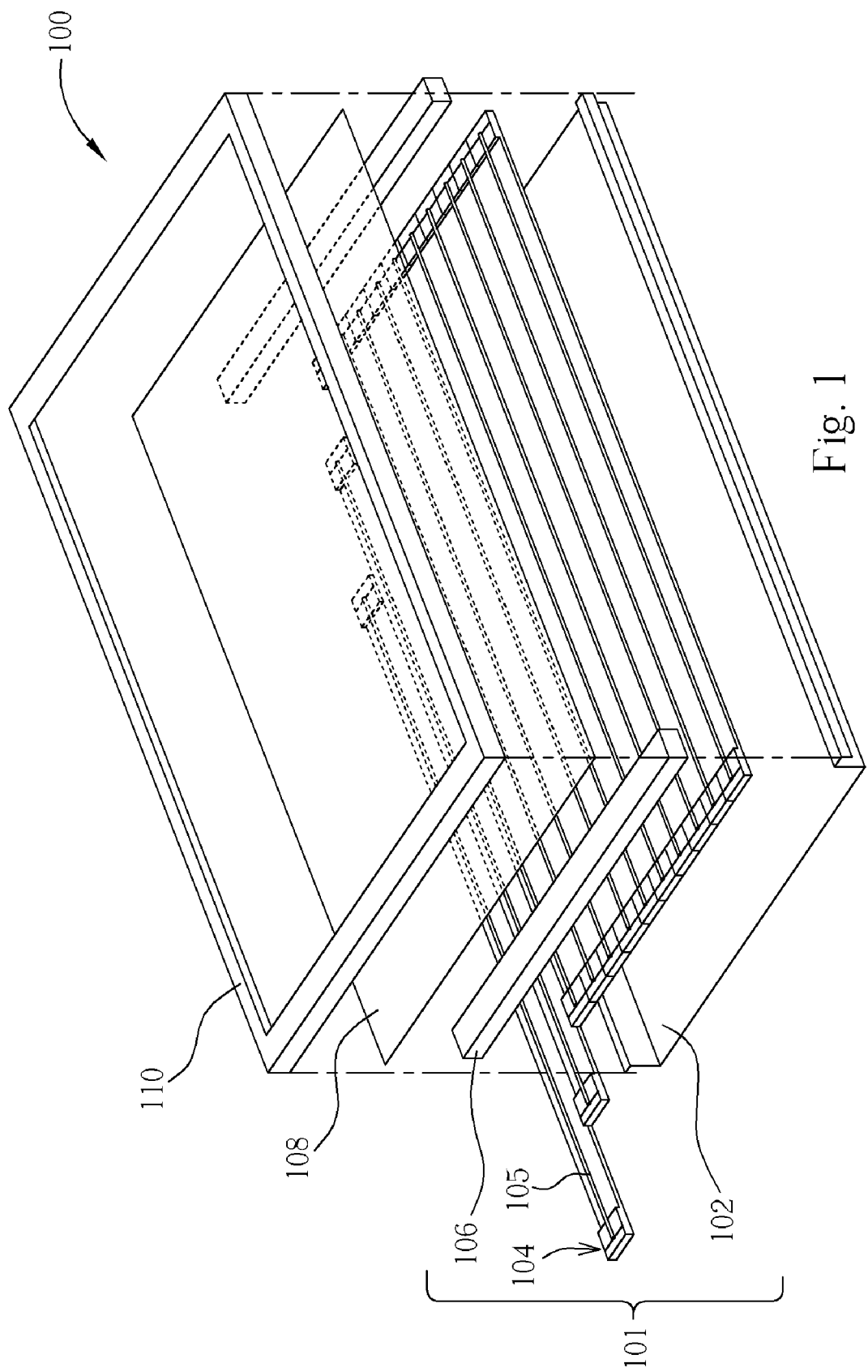
FIG. 1 is an exploded drawing of the LCD with the backlight module according to the present invention.

FIG. 1 illustrates a magnified view of an LCD comprising a backlight module according to the present invention. The LCD 100 includes a backlight module 101, an optical film set (not shown), an LCD panel 108, and a bezel 110. The backlight module 101 includes a back plate 102, a plurality of replaceable light source sets 104, a plurality of external electrode lamps 105, and a fastening device 106. The LCD panel 108 is disposed on the fastening device 106. The distinct features of LCD will be described later in more detail.

Figure 2:
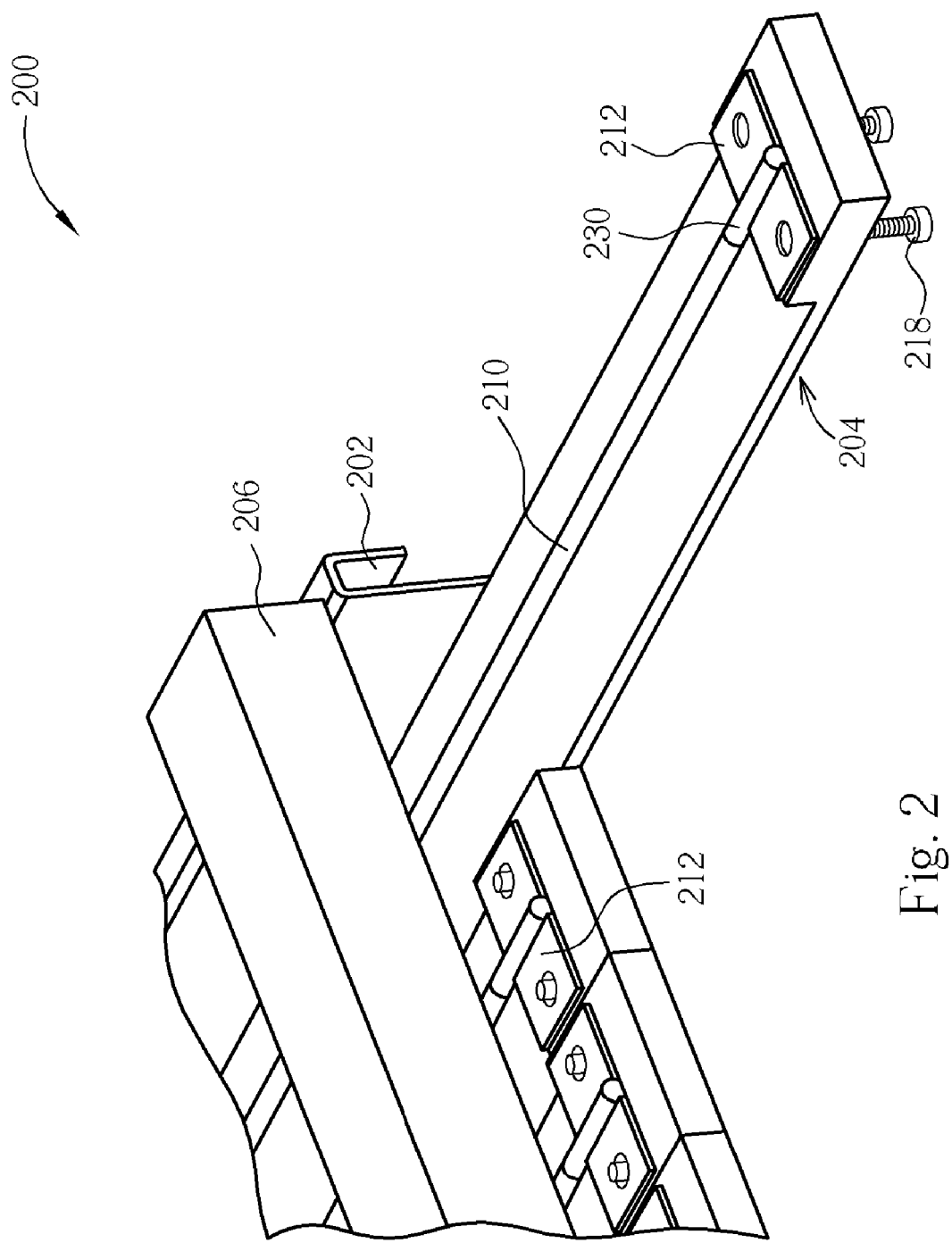
FIGS. 2 and 3 show various views of the backlight module according to an embodiment of the present invention.
Figure 3:
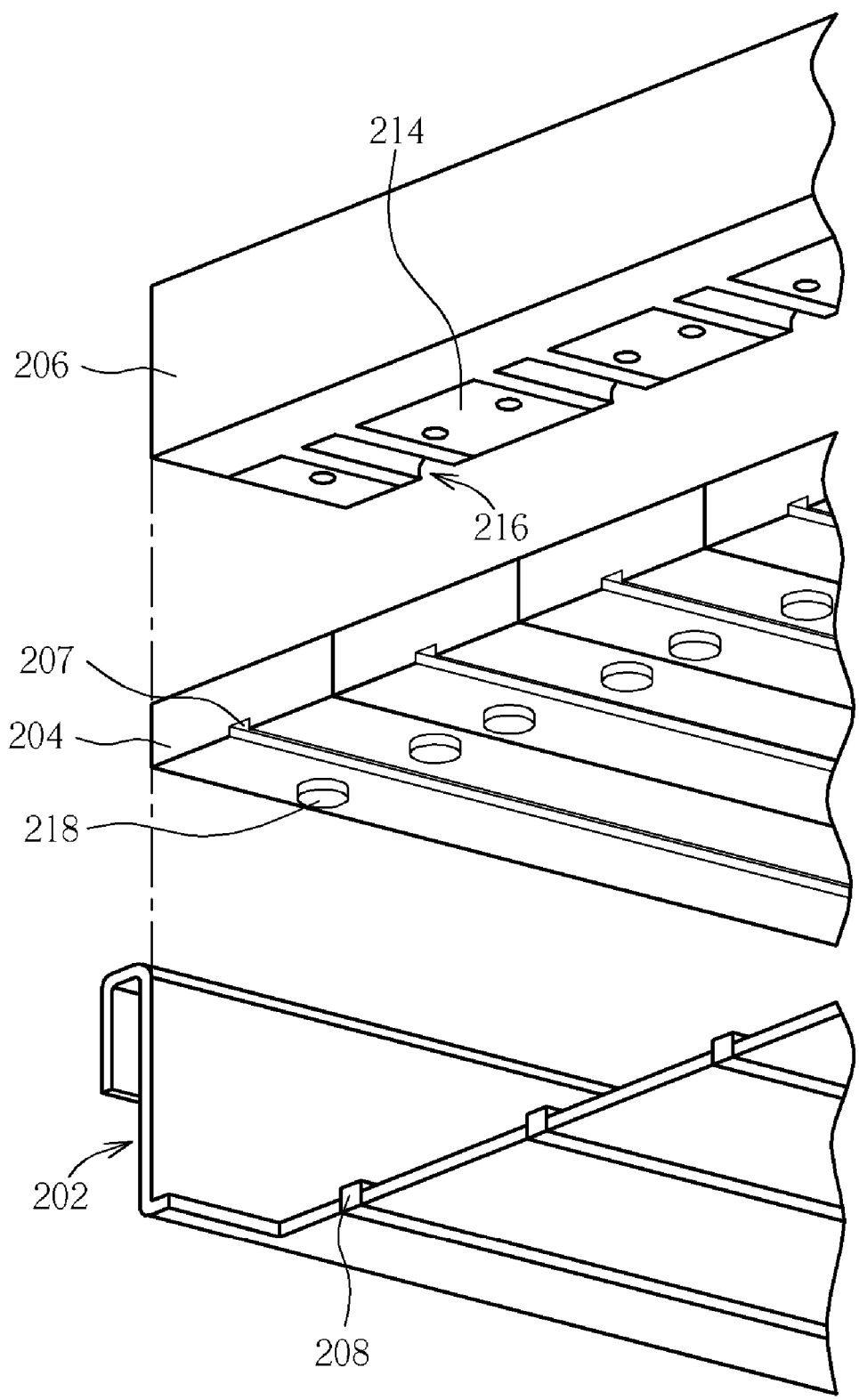

FIGS. 2 and 3 show various views of a backlight module according to an embodiment of the present invention. As shown in FIGS. 2 and 3, the backlight module 200 includes a back plate 202, a plurality of replaceable light source sets 204, a plurality of external electrode lamps 210, and a fastening device 206. The back plate 202 includes a plurality of first track sets 208 disposed on a surface thereof. The replaceable light source sets 204 are disposed on the back plate 202. Each of the replaceable light source sets 204 includes a second track set 207 and an electrically conductive strip 212. As shown in FIG. 3, the second track set 207 is used to connect to and slide onto one of the first track sets 208. The replaceable light source sets 204 may have a first notch. The electrically conductive strip 212 may have an indentation in compliance with the first notch to accommodate an external electrode 230 of the external electrode lamp 210. The number of the external electrode lamps 210 on the replaceable light source set 204 is in no way limited. The external electrode lamp 210 is also not limited to being a specific type, and may comprise of being an external electrode fluorescent lamp (EEFL) amongst other types.

Figure 6:
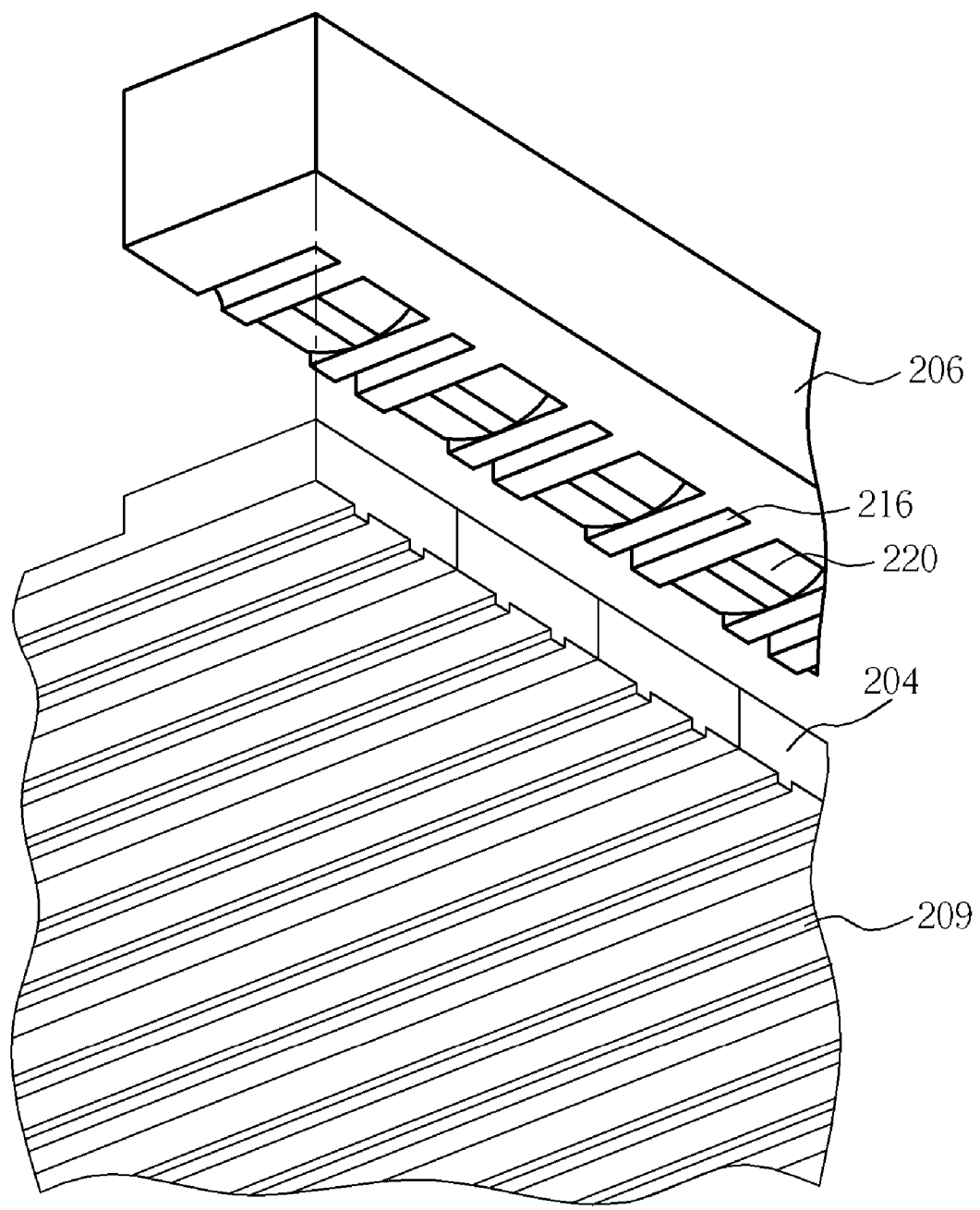
FIG. 6 illustrates the fastening of the replaceable light source sets according to an embodiment the present invention.

The fastening device 206 is used for fastening the replaceable light source sets 204. The fastening device 206 includes a plurality of electrically conductive elements 214, such as a plate, a strips, or elastic pieces 220 (as shown in FIG. 6). Each electrically conductive element 214 strides across a gap between two adjacent components of the electrically conductive strips 212 on the replaceable light source sets 204 and accordingly contacts them to thereby electrically connect in parallel the external electrode lamps 210. Each replaceable light source set 204 comprises a segment of the electrically conductive strip 212 such that a plurality of electrically conductive strips 212 are separable. In this manner, the replaceable light source sets 204 can be detached from each other, and can easily be drawn out from the backlight module for lamp replacement or maintenance.

As shown in FIG. 3, the fastening device 206 may further comprise a plurality of second notches 216, each notch placed between two adjacent electrically conductive elements 214. The second notch 216 together with the first notch accommodates the external electrode of the external electrode lamp 210.

Figure 4:
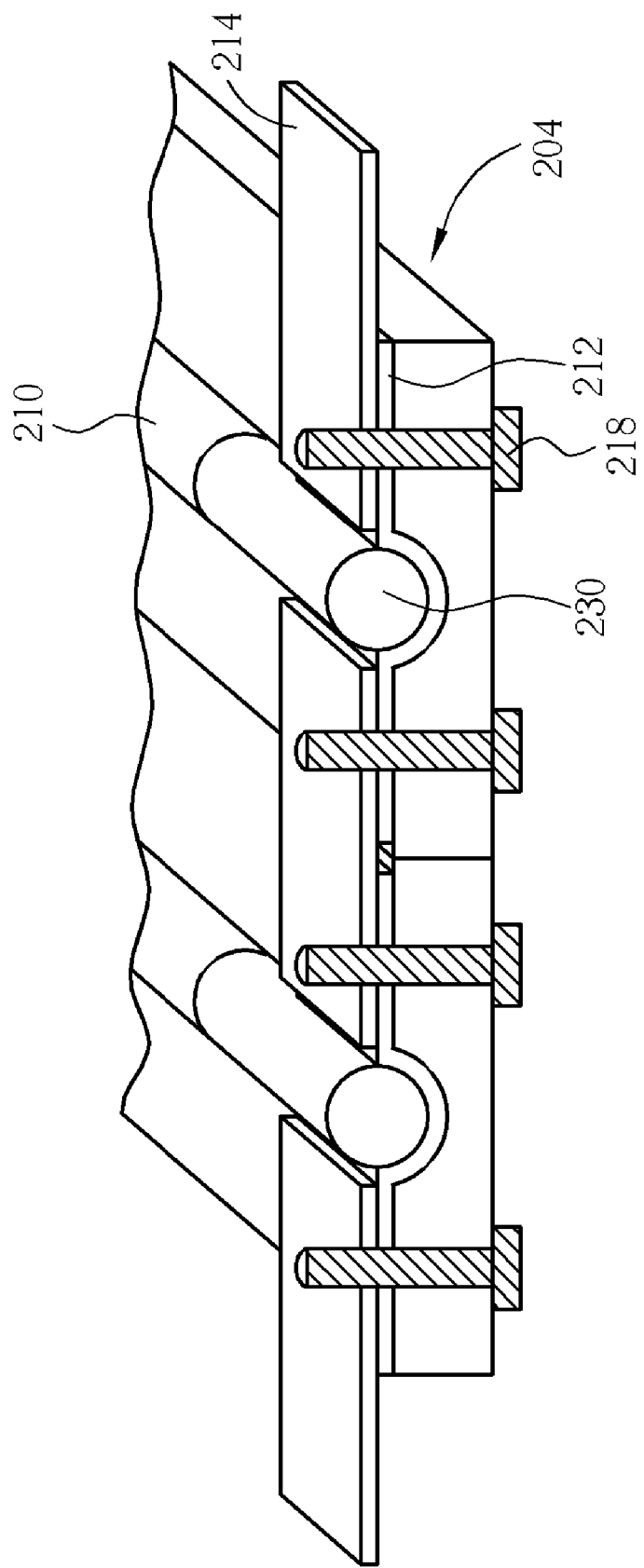
FIGS. 4 and 5 show cross section drawings of two embodiments for the combination of the replaceable light source sets, the external electrode lamps, and the electrically conductive element(s) in the backlight module according to the present invention.
Figure 5:
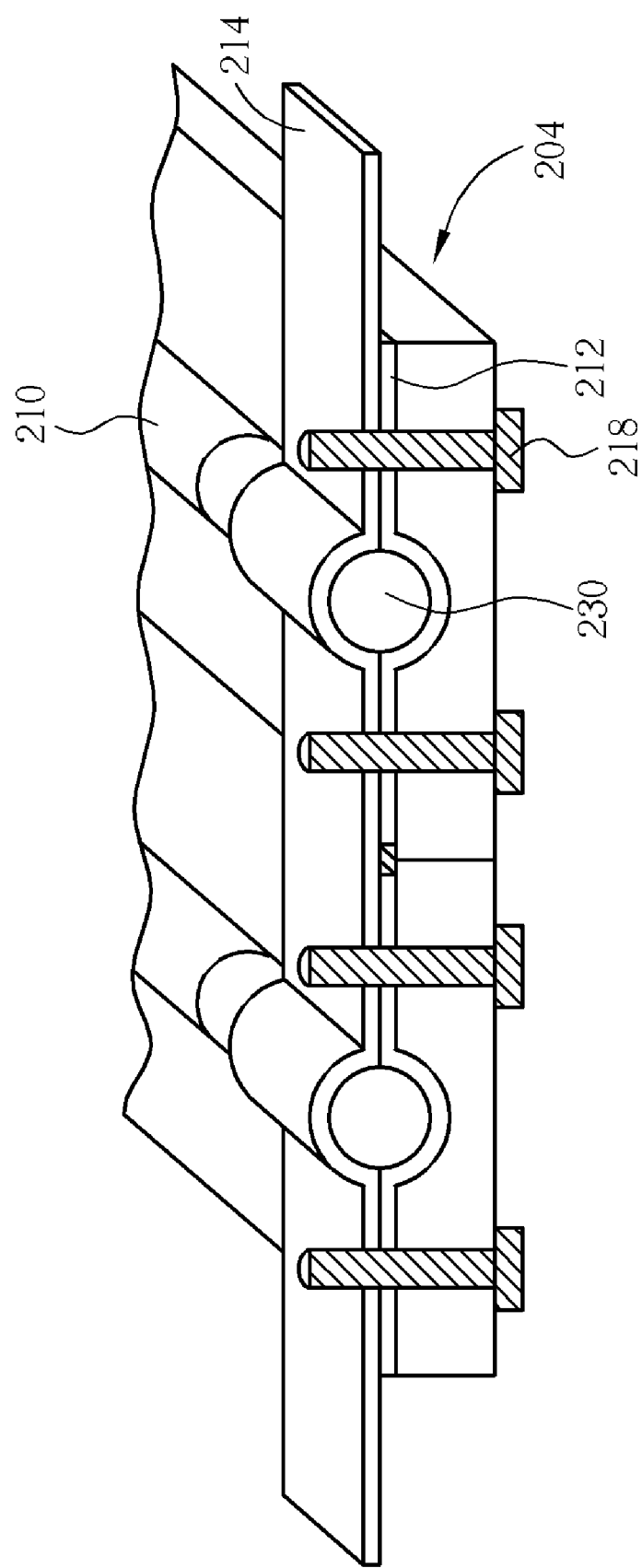

The fastening device 206 provides both a fastening means and a method to electrically connect the replaceable light source sets 204. For example, one embodiment can have the replaceable light source sets 204 fastened to the fastening device through screws 218, such as shown in FIG. 3. Each replaceable light source set 204 is therefore fastened to the fastening device 206 in such a way that the each electrically conductive element 214 strides across a gap between two electrically conductive strips 212 of two adjacent replaceable light source sets 204 and contacts them to thereby electrically connect the external electrode lamps 210 in parallel, as shown in FIGS. 4 and 5. FIGS. 4 and 5 show cross section drawings of two illustrative examples for the combination of the replaceable light source sets 204 and the electrically conductive elements 214 through the screws 218. The electrically conductive elements 214 may be in a form of separate pieces (as a plurality of plates), and positioned apart from each other, as shown in FIG. 4. Alternatively, the electrically conductive element 214 may be in a form of a continuous whole piece, as a strip, as shown in FIG. 5.

FIG. 6 shows yet another embodiment for fastening of the replaceable light source sets 204. The electrically conductive elements 214 of the fastening device 206 include an elastic piece 220. Each elastic piece 220 provides sufficient resilience to be pressed on accordingly to two adjacent electrically conductive strips. In this manner, the replaceable light source sets 204 including the external electrode lamp 210 can be fixed onto the backlight module. At the same time, because each elastic piece 220 strides across a gap between the two adjacent electrically conductive strips 212 of the replaceable light source sets 204 and contacts them, the external electrode lamps 210 are electrically connected in parallel. The elastic piece can comprise of an arc shape, but is not limited to this shape. Since in this embodiment, screws are not used for fastening the replaceable light source sets 204, the replaceable light source sets 204 may have the track sets 209 conveniently placed in a configuration as illustrated in FIG. 6.

Figure 7:
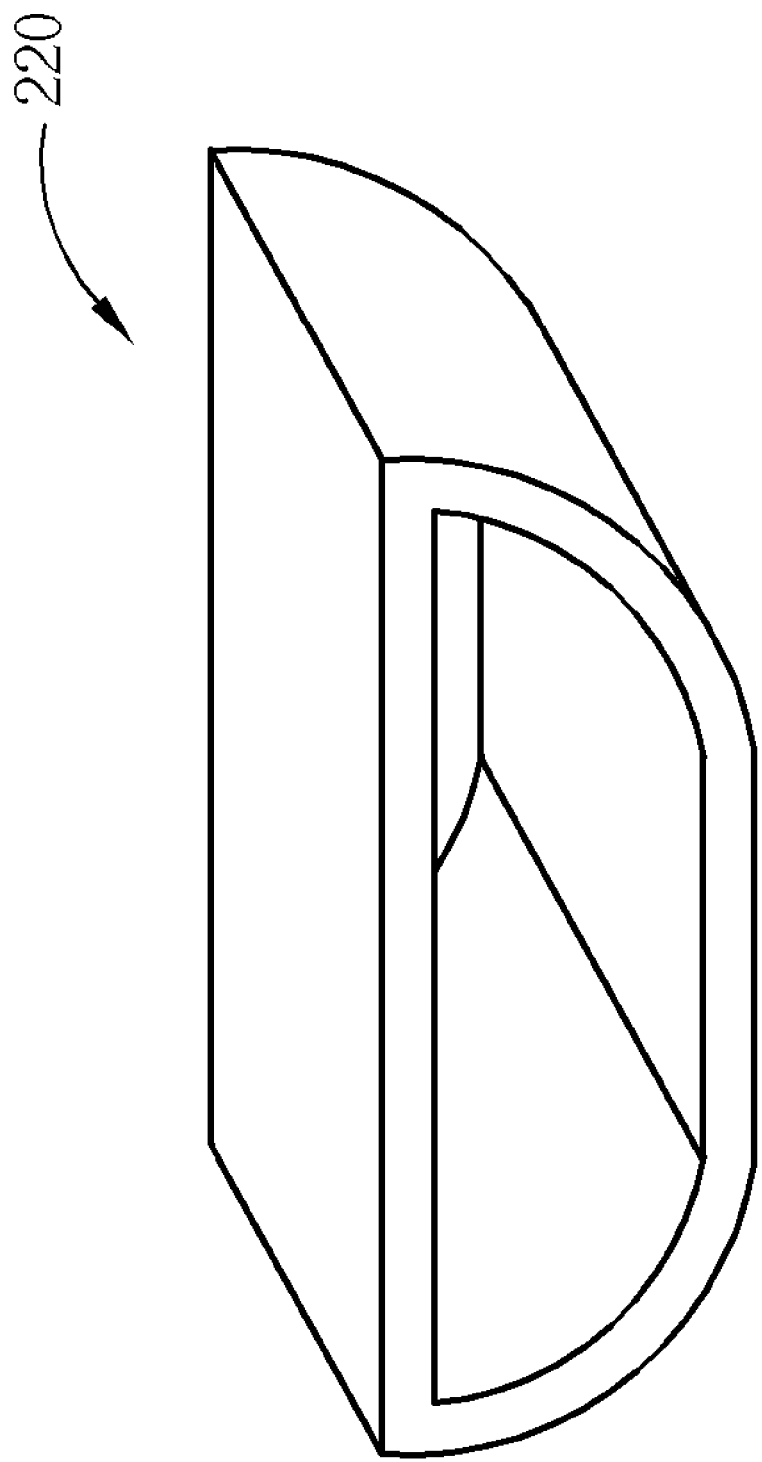
FIG. 7 shows an embodiment of the elastic piece according to the present invention.
Figure 8:
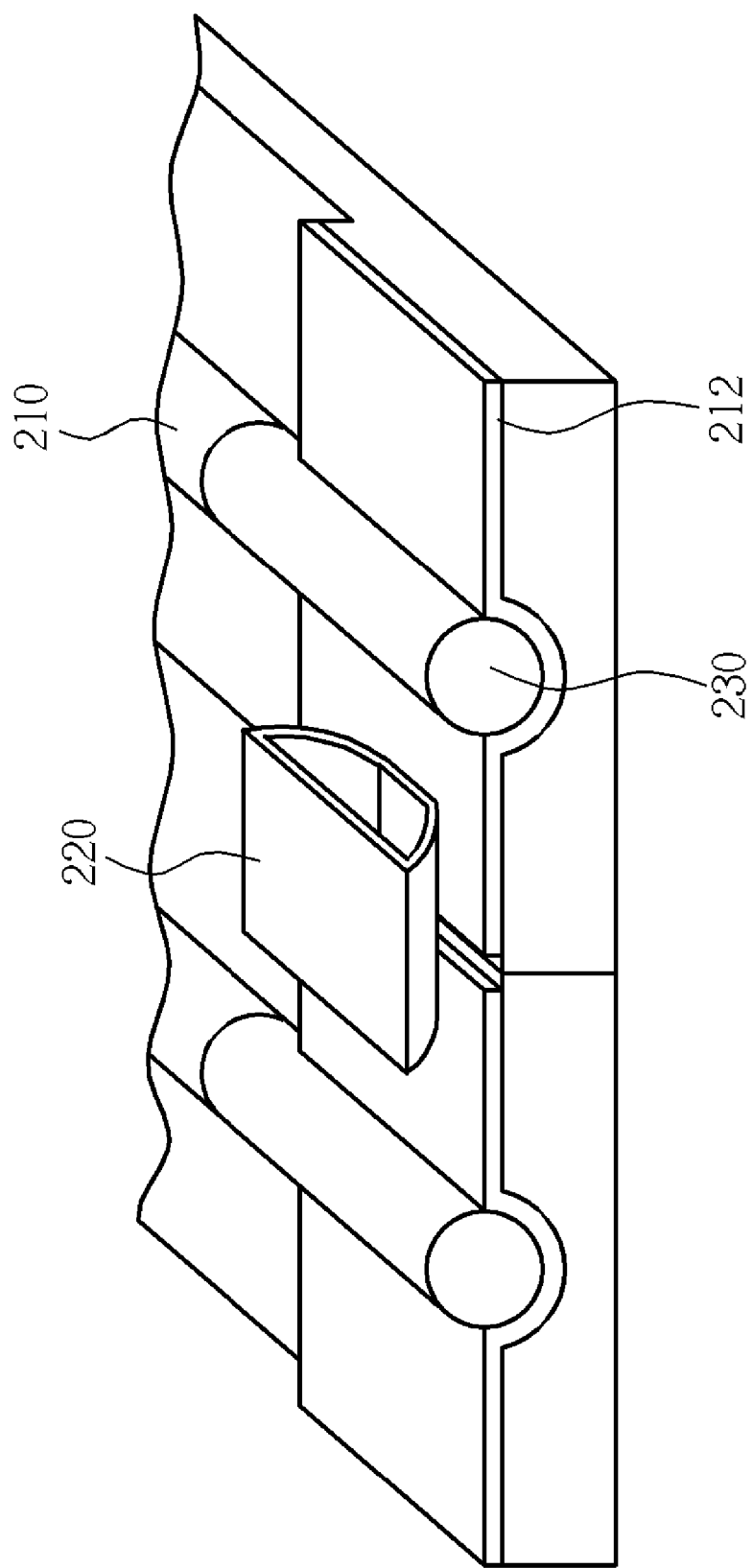
FIG. 8 shows an embodiment of the combination of the elastic piece, the external electrode lamps, and the replaceable light source sets in the backlight module, according to the present invention.

FIG. 7 shows an example of the elastic piece 220. The elastic piece 220 may be made of a metal sheet with a hollow in the central part and be elastic. Fig. 8 shows how the elastic piece 220 strides across a gap between the two adjacent electrically conductive strips 212 and is positioned thereon for the electrical connection for the adjacent electrically conductive strips 212, and, in turn, for the electrical connection for the external electrodes 230 lying on the electrically conductive strips 212.

Figure 9:
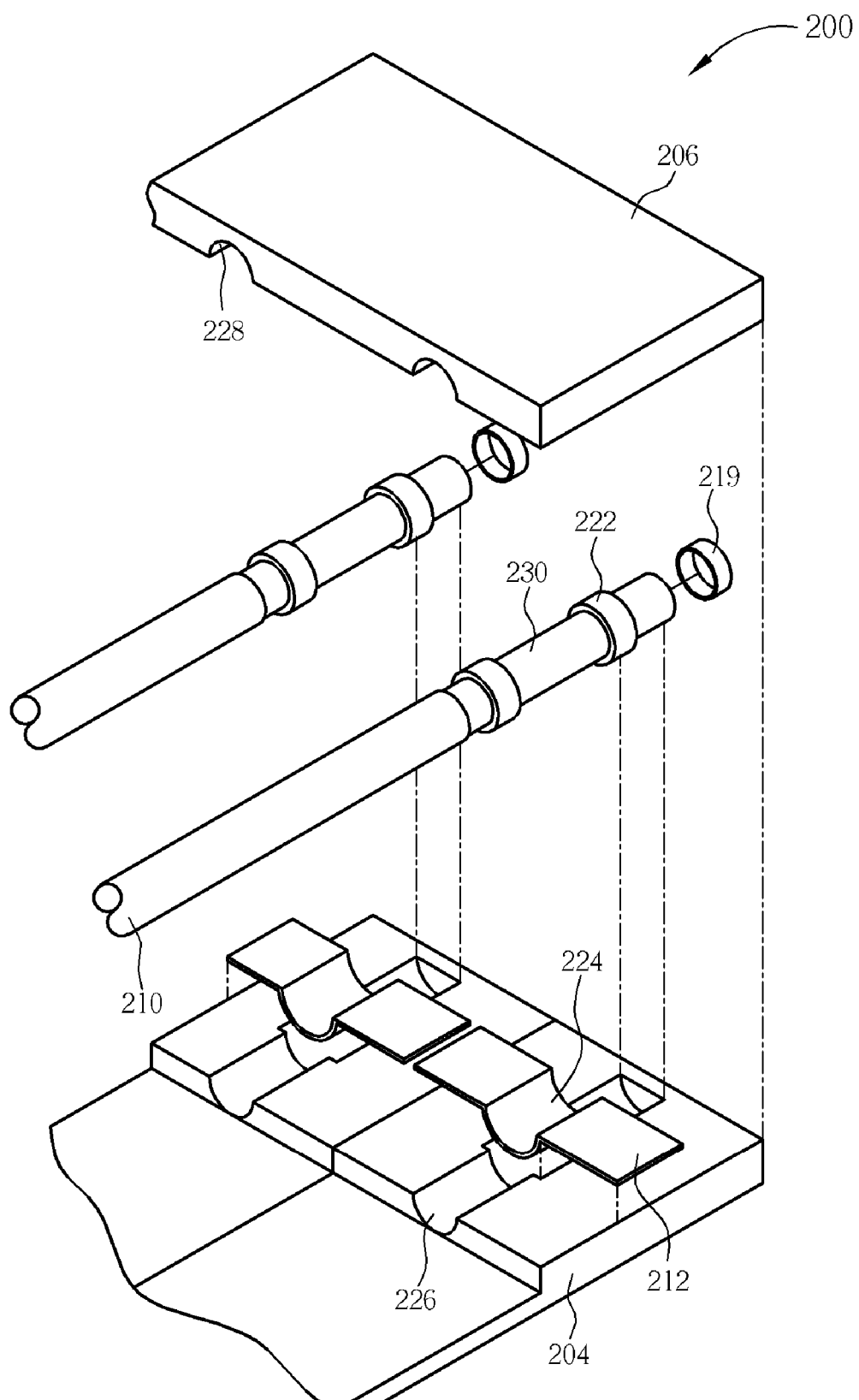
FIG. 9 illustrates a backlight module according to an embodiment of the present invention.

In order to increase the shock resistance of the external electrode lamp 210 of the backlight module, a cushion 222 is added surrounding the external electrode lamp 210, as shown in FIG. 9. The cushion 222 is positioned between the external electrode 230 and the fastening device 206, or between the replaceable light source sets 204. The cushion 222 can be made of rubber or an alternate shock-absorbing material with sufficient elasticity.

When the external electrode lamp 210 is assembled onto the backlight module 200, the external electrode is able to withstand damage from vibrations by contacting the cushion 222 in conjunction with the fastening device 206, or through the replaceable light source sets 204. In addition, the cushion 222 also provides for a proper fitment in the horizontal direction to prevent the external electrode lamp 210 from sliding towards either the indentation 224 or the second notch 228. An alternate design of the cushion area could include an expansion area, approaching the indentation 224 or the second notch 228 that corresponds to the cushion 222 or a tip section 219 of the end of the external electrode 210. The tip section 219 can be made of elastic materials, such as plastic composites or sponges that are capable of increasing shock absorbance and impact resistance. Moreover, the tip section 219 can be made in various shapes including caps, circles, or flakes in accordance to each specific application. After the external electrode lamp 210 is placed onto the replaceable light source sets 204, the fastening device 206 and the replaceable light source sets 204 can be positioned through screws or tenons, or fastened through contact with the elastic pieces.

The fastening device 206 and the base of the replaceable light source sets 204 can be made of plastic or other insulating materials such as bakelite. The curvature of the indentation 224 may be slightly less or more than the curvature of the first notch 226 or the second notch 228. In addition, a protruding structure (not shown) can be added on the first notch 226 or the second notch 228 so that when the backlight module 200 is assembled, the electrically conductive strip 212 is more tightly connected with the external electrode 230.

Figure 10:
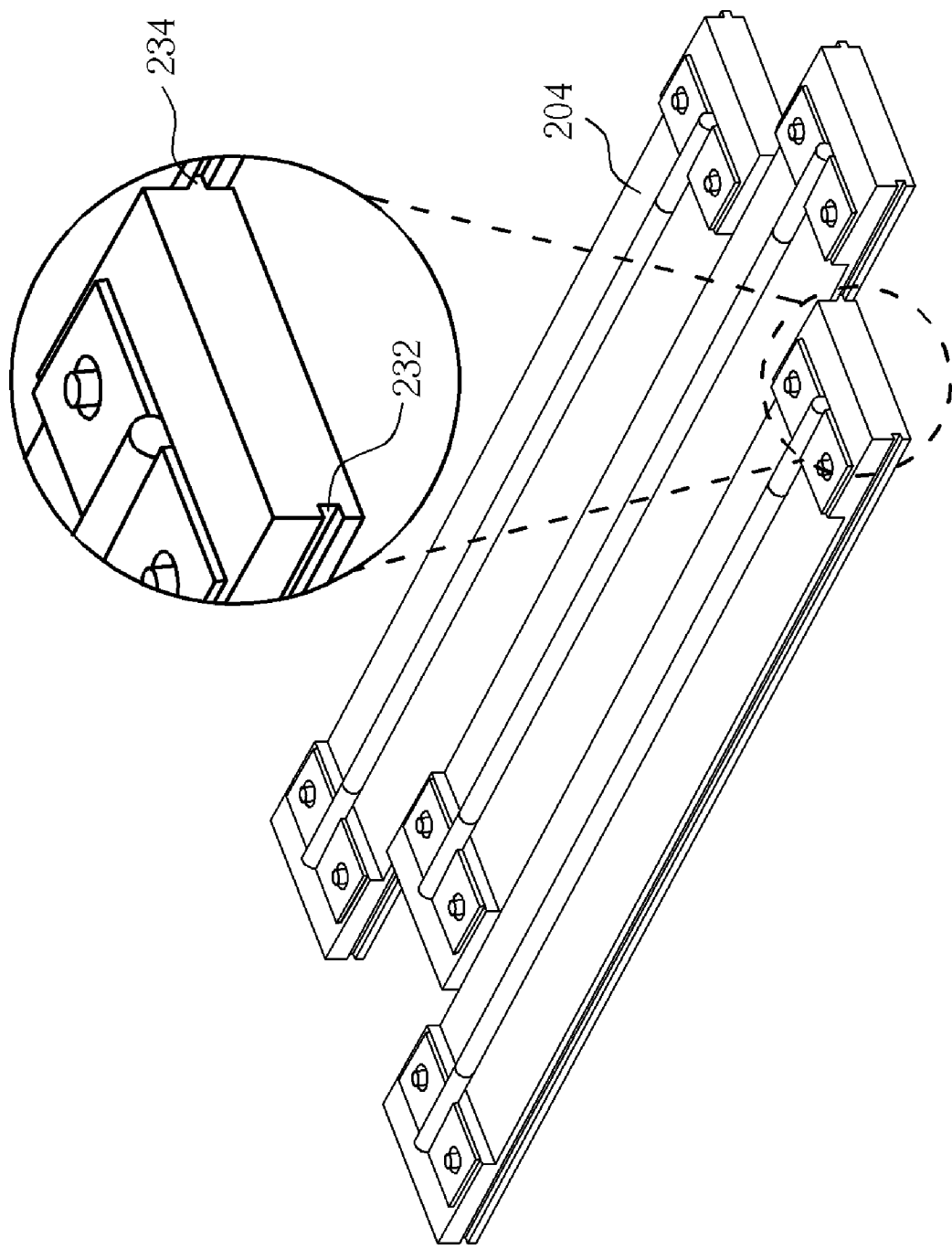
FIG. 10 illustrates a replaceable light source set according to an embodiment of the present invention.

FIG. 10 shows another aspect of the present invention, where the replaceable light source sets 204 each can comprise a lateral track set 232 on one side, with another lateral track set 234 on the other side. This is arranged such that one of the replaceable light source sets 204 can be assembled with another set by sliding the track set of one replaceable light source set 204 onto the track set of another replaceable light source set 204. With this configuration, a back plate need not be used. If a back plate were indeed used, it would not be necessary for the back plate to include track sets for the replaceable light source sets 204 to slide onto.

The backlight module may further include an inverter. The electrically conductive strip or the electrically conductive element can be electrically connected to the inverter to provide power to each external electrode. By connecting the external electrode of the external electrode lamp with the electrically conductive strip, or by directly connecting the electrically conductive element, power can be delivered smoothly to the external electrode lamps forming a completed parallel circuit.

A reflecting backboard may also be added underneath the backlight module to redirect stray light from the backlight module in the outwards direction.

The backlight module of the present invention may also be utilized in a display device, such as, a TFT-LCD, or even be used simply as a light source.

By completely covering the external electrode with the fastening device and the replaceable light source sets, the backlight module is able to develop a well-formed electrode cladding to prevent electric shocks. In addition, the backlight module also provides good shock absorbance and impact resistance by providing a cushion between the external electrode and the fastening device.

Moreover, the lamp used in the backlight module according to the present invention can be individually installed on the back plate, or using a combinatorial structure. More specifically, each replaceable light source set can be independently mounted on and dismounted from the back plate. The side of the liquid crystal display contains an opening for the positioning of the lamps, allowing the lamps to be mounted or dismounted conveniently without disassembling the entire liquid crystal display. This significantly reduces the risk of damaging various components during the replacement of lamps.

All combinations and sub-combinations of the above-described features also belong to the present invention. Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A backlight module, comprising:
a first replaceable light source set comprising a first electrically conductive strip, a first lateral track set, and a first external electrode lamp;
a second replaceable tight source set adjacent to said first replaceable light source set and comprising a second electrically conductive strip, a second lateral track set, and a second external electrode lamp;
wherein said first lateral track set is directly assembled with said second lateral track set a longitudinal axis of said first and second lateral track sets are substantially parallel to a longitudinal axis of said first and second external electrode lamps, each of said first and second external electrode lamps comprises one external electrode electrically connected with said first or second electrically conductive strip, and there is a gap between said first electrically conductive strip and said second electrically conductive strip; and
an electrically conductive element striding across said gap and electrically connected to said first electrically conductive strip and said second electrically conductive strip;
wherein the first and second replaceable light source sets are individually drawn to detach from each other by sliding with the first and second lateral track sets.

2. The backlight module of claim 1, wherein each of said first and said second replaceable light source sets further comprises a first notch for accommodating said first or second electrically conductive strip and said external electrode.

3. The backlight module of claim 1, wherein said electrically conductive element is a plate.

4. The backlight module of claim 1, wherein said electrically conductive element is a strip having a plurality of indentations for accommodating said external electrode.

5. The backlight module of claim 1, wherein said electrically conductive element is an elastic piece.

6. The backlight module of claim 1, wherein said electrically conductive element is fastened to said first and second electrically conductive strips with screws or tenons.

7. The backlight module of claim 1, wherein each of said first and second external electrode lamps further comprises a cushion surrounding said external electrode.

8. The backlight module of claim 1, wherein each of said first and second external electrode lamps further comprises a tip section on an end thereof.

9. The backlight module of claim 1, further comprising a fastening device for fastening said first and said second replaceable light source sets, wherein said electrically conductive element is disposed on said fastening device.

10. The backlight module of claim 9, wherein said fastening device comprises a second notch for accommodating said external electrode.

11. A display device, comprising:
a back plate;
a backlight module comprising:
   a first replaceable light source set disposed on the back plate and comprising a first electrically conductive strip, a first lateral track set, and a first external electrode lamp;
   a second replaceable light source set adjacent to said first replaceable light source set disposed on the back plate and comprising a second electrically conductive strip, a second lateral track set, and a second external electrode lamp,
      wherein said first lateral track set is directly assembled with said second lateral track set a longitudinal axis of said first and second lateral track sets are substantially parallel to a longitudinal axis of said first and second external electrode lamps, each of said first and second external electrode lamps comprises one external electrode electrically connected with said first or second electrically conductive strip, and there is a gap between said first electrically conductive strip and said second electrically conductive strip; and
   an electrically conductive element striding across said gap and electrically connected to said first electrically conductive strip and said second electrically conductive strip; and
a display panel disposed on the backlight module;
wherein the first and second replaceable light source sets are individually drawn to detach from each other by sliding with the first and second lateral track sets.

12. The display device of claim 11, wherein said electrically conductive element is a plate.

13. The display device of claim 11, wherein said electrically conductive element is a strip having a plurality of indentations for accommodating said external electrode.

14. The display device of claim 11, wherein said electrically conductive element is an elastic piece.

15. The display device of claim 11, wherein each of said first and second external electrode lamps further comprises a cushion surrounding said external electrode.

16. The display device of claim 11, wherein each of said first and second external electrode lamps further comprises a tip section on an end thereof.

17. The display device of claim 11, wherein said back plate further comprises a first track set.

18. The display device of claim 17, wherein each of said first and said second replaceable light source sets further comprises a second track set corresponding to the first track set.

* * * * *